United States Patent
Tinker et al.

(10) Patent No.: US 11,522,926 B1
(45) Date of Patent: Dec. 6, 2022

(54) METHOD OF IMPLEMENTING AN INTERACTIVE PRESENTATION IN THE FORM OF AN INTERACTIVE LEGAL HEARING IN REAL-TIME

(71) Applicant: Eugene Tinker, Kennesaw, GA (US)

(72) Inventors: Eugene Tinker, Kennesaw, GA (US); Monica Emmons Ewing, Kennesaw, GA (US); Long Hoang Nguyen, Kennesaw, GA (US); Digvijay Singh Naruka, Kennesaw, GA (US)

( * ) Notice: Subject to any disclaimer, the term of this patent is extended or adjusted under 35 U.S.C. 154(b) by 0 days.

(21) Appl. No.: 17/472,626

(22) Filed: Sep. 11, 2021

Related U.S. Application Data (60) Provisional application No. 63/077,637, filed on Sep. 13, 2020.

(51) Int. Cl.
- *G06F 3/0484* (2022.01)
- *G06Q 50/26* (2012.01)
- *H04L 65/4038* (2022.01)
- *H04L 67/02* (2022.01)
- *H04L 9/40* (2022.01)

(52) U.S. Cl.
CPC ........ *H04L 65/4038* (2013.01); *G06F 3/0484* (2013.01); *G06Q 50/26* (2013.01); *H04L 63/083* (2013.01); *H04L 67/02* (2013.01)

(58) Field of Classification Search
CPC ... H04L 65/4038; H04L 63/083; H04L 67/02; G06F 3/0484; G06Q 50/26
See application file for complete search history.

(56) References Cited

U.S. PATENT DOCUMENTS

| | | | | |
|---|---|---|---|---|
| 5,382,972 A | * | 1/1995 | Kannes | H04N 7/144 348/E7.083 |
| 5,956,687 A | * | 9/1999 | Wamsley | G06Q 40/08 715/208 |
| 7,941,412 B2 | * | 5/2011 | Dunne | G06Q 50/18 707/694 |

(Continued)

FOREIGN PATENT DOCUMENTS

| CN | 105825446 A | * | 8/2016 |
| CN | 109754097 A | * | 5/2019 |
| WO | WO2001020515 A1 | * | 3/2001 |

OTHER PUBLICATIONS

Wan Satirah Wan Mohd Saman, Abrar Haider, E-court: Information and communication technologies for civil court management, 2013, 9 pages (Year: 2013).*

(Continued)

*Primary Examiner* — Yongjia Pan
(74) *Attorney, Agent, or Firm* — Fraline J. Allgaier

(57) ABSTRACT

A computer system providing audio and visual proceedings between staff, admin, and citizen users in a virtual courtroom environment and wherein the computer system facilitates the proceedings in the virtual courtroom. The computer system includes a plurality of graphical user interfaces providing unique passcodes for joining a proceeding, schedules, audio and video capacities, and custom legal document preparation and acknowledgement. The computer system allowing the staff, admin, and citizen users to interact privately in the proceedings and the proceedings being encrypted and recorded in accordance with the law.

8 Claims, 13 Drawing Sheets

(56) References Cited

U.S. PATENT DOCUMENTS

| | | | | |
|---|---|---|---|---|
| 8,412,628 B2* | 4/2013 | Beach | ............... | G06F 40/174 |
| | | | | 705/40 |
| 8,477,662 B2* | 7/2013 | Schneider | ............... | H04N 7/15 |
| | | | | 709/227 |
| 2001/0053967 A1* | 12/2001 | Gordon | ............... | G06Q 10/10 |
| | | | | 703/22 |
| 2003/0055701 A1* | 3/2003 | Dutta | ............... | G06Q 30/0284 |
| | | | | 705/1.1 |
| 2006/0031125 A1* | 2/2006 | Zilberfayn | ............... | G06Q 50/26 |
| | | | | 705/26.1 |
| 2011/0178936 A1* | 7/2011 | Mohan | ............... | G06Q 10/10 |
| | | | | 705/311 |
| 2011/0196723 A1* | 8/2011 | Baszucki | ............... | G06Q 30/02 |
| | | | | 715/757 |
| 2014/0267574 A1* | 9/2014 | Schneider | ............... | H04M 3/567 |
| | | | | 348/14.09 |
| 2015/0149370 A1* | 5/2015 | Klein | ............... | G06Q 50/184 |
| | | | | 705/311 |
| 2016/0210607 A1* | 7/2016 | Griffin | ............... | G06F 16/958 |
| 2017/0357941 A1* | 12/2017 | Best | ............... | G06Q 10/10 |

OTHER PUBLICATIONS

Pornpen Rungruangpattana, Tiranee Achalakul, The Software Prototype of Civil Court Case Management in Thailand, 2008, 5 pages (Year: 2008).*

Pornpen Rungruangpattana, Tiranee Achalakul, The design framework of the civil court case management system in Thailand, 2007, 4 pages (Year: 2007).*

\* cited by examiner

TCOURT®

📅 TUESDAY, 8TH DECEMBER, 2020

WELCOME TO ICOURT SYSTEM. PLEASE USE THE FOLLOWING SECTION TO SEARCH FOR YOUR SCHEDULED COURT DATE(S).

NOTE
A PERSONAL COMPUTER (DESKTOP/LAPTOP) OR A MOBILE DEVICE (SMARTPHONE/ TABLET) EQUIPPED WITH CAMERA AND MICROPHONE (FOR VIDEO AND AUDIO CONFERENCING CAPABILITIES). PERSONAL COMPUTER IS RECOMMENDED. MUST HAVE A STABLE INTERNET CONNECTION.

WEB BROWSER RECOMMENDATIONS:
  ON COMPUTERS RUNNING WINDOWS: LATEST GOOGLE CHROME
 ON MACS (MACBOOK, IMAC) AND IOS (IPHONE/IPAD) DEVICES: SAFARI V. 12+/ macossierra+)
 ON ANDROID DEVICES (MOBILE PHONES / TABLETS): LATEST GOOGLE CHROME

146

SEARCH / BUSCAR

FIRST NAME / NOMBRE DE PILA  LAST NAME / APELLIDO

| ENTER FIRST NAME | ENTER LAST NAME |

DATE OF BIRTH / FECHA DE NACIMIENTO

| MM/DD/YYYY |

☐ I'M NOT A ROBOT RECAPTCHA
        PRIVACY - TERMS

SEARCH

FIG. 7

DO YOU CONFIRM THAT FOLLOWING INFORMATION YOU HAVE SUBMITTED IS CORRECT?

👤 JOHN DOE
📋 01/01/2000
✉️ [          ]
📞 (334) 999-9999

YOU ARE NOT AN ATTORNEY OR REPRESENTED BY ATTORNEY.

YOU WERE NOT UNDER 21 WHEN YOU RECEIVED THE CITATION(S).

YOU WERE CHARGED WITH DUI.

YOU WERE CHARGED WITH HIT AND RUN / FLEEING.

YOU WERE CHARGED WITH RECKLESS DRIVING

NOTE
WE MIGHT CALL YOUR CELL PHONE, IF THERE ARE ANY ISSUES WITH THE CONNECTION.

[ CONFIRM ]   [ CHANGE/EDIT ]

26 W CAMPBELLTON STREET
FAIRBURN, GA 30213
(770) 683-4611

GUILTY NOLO MERGED DIS. REDUCE
- (X)    ( )    ( )    ( )   ( )
- ( )    ( )    ( )    ( )   ( )
- ( )    ( )    ( )    ( )   ( )
ERRED ADJUDICATION

204

CLOSE

DUI FORM

DECEMBER 8, 2020  4:07 PM

SENT BY: SOLICITOR O (SOLICITOR)

PLEASE TYPE YOUR FULL NAME TO SIGN

JOHN DOE

DONE

*FIG. 13*

VIDEO   SESSION   CASE

| END THE SESSION | TAKE OFFENDER TO A QUEUE | TRANSFER OFFENDER | INVITE STAFF TO THE SESSION |

FIG. 14

| SN# | TIME | OFFENDER NAME | STATUS | ACTION |
|---|---|---|---|---|
| | | VIDEO SESSION PAYMENT RESET PRETRIAL CASE | | ADD |
| 1 | 10:54 AM | RED LIGHT RUNNER | AGREED TO PAY | 👁 🗑 |

VIDEO SESSION PRETRIAL CASE

→ RECKLESS DRIVING ▼   ADD

LIST OF RECKLESS DRIVING

| SN# | TIME | OFFENDER | STATUS | ACTION |
|---|---|---|---|---|
| 1 | 12:53 PM | DUI TEST | COMPLETED | 👁 🗑 |

METHOD OF IMPLEMENTING AN INTERACTIVE PRESENTATION IN THE FORM OF AN INTERACTIVE LEGAL HEARING IN REAL-TIME

RELATED APPLICATIONS

This application claims priority of U.S. Provisional Patent Application Ser. No. 63/077,637 filed Sep. 13, 2020.

FIELD OF THE INVENTION

A method of implementing an interactive presentation comprising a computer system that includes a website is presented. The presentation generated during the live session is an interactive legal hearing held in real-time on the computer system and transmitted between a plurality of user devices.

BACKGROUND OF THE INVENTION

The invention is a method of implementing an interactive presentation comprising a computer system that includes a website that is designed specifically for audio and visual court sessions including arraignment hearings, first appearance hearings, motion hearings, trials, and a plurality of legal hearings as prescribed herein. The computer system facilitates encrypted interactions between offenders (hereinafter citizen users) and court staff, including the solicitor or prosecutor, public defender or retained lawyer, probation officer, clerks, interpreter, and a judge. The invention allows for private conversations between staff users and easy interface amongst all parties. Required legal documents can be generated and signed through the computer system and relevant data is stored for future access. All proceedings are recorded and stored as required by law.

It is well known in the prior art that courts are equipped to conduct legal proceedings with existing audio-visual computer systems. In most cases, courts have begun using simple video-conferencing computer systems to manage a portion of their daily operations. However, courts are unable to host grand juries, jury trials, and high-volume calendars using existing technologies.

The Covid-19 pandemic created additional challenges for the justice system to host legal proceedings. In-person court procedures could not be adapted to meet CDC guidelines while simultaneously complying with constitutional obligations. High-volume matters including traffic court, grand juries, and jury trials also remained shut down. Additionally, consumer available video-conferencing computer systems do not properly encrypt data, leaving otherwise private information exposed. This invention universally solves all of these issues for courts of any class and jurisdiction.

Prior to the Covid-19 pandemic, the judicial system was converting as many matters as possible to virtual interactions. There were limitations on the type of proceedings that could be conducted virtually because of constitutional and state law requirements, as well as technology limitations. In the event that the challenges faced as a result of the Covid-19 pandemic dissipate, this invention enables courts to expand their virtual court proceedings to include all hearing types. The move to virtual court sessions is therefore efficient, economical, and safer for court personnel and the public.

To this end, a method of implementing an interactive legal hearing held in real-time on a computer system and transmitted between a plurality of user devices via a website is disclosed. The computer system includes a website having a graphical user interface and a plurality of modules including a search module, a login authentication module, an information module, a queue module, a live session module, a court date scheduling module, an account profile module, a court staff module, a video module, a support queue module, and an admin dashboard module. The method of implementing the interactive legal hearing is further characterized with the following novel features: (1) transmitting, by a computer system, a graphical user interface to a user device, wherein the graphical user interface displays user interface elements for interacting with a plurality of computer system modules; (2) wherein after receiving, by the computer system, a request for user access and user credentials from a plurality of user devices in a login authentication module, receiving information pertaining to a user correlated to information for a court hearing, a live session is then generated by networking a plurality of the users within the live session module created by the computer system; (3) generating a presentation in the live session and transmitting the presentation to the user participants of the live session; (4) transmitting a plurality of forms from a user authenticated as a staff user to a user authenticated as a citizen user, by the computer system, wherein the forms may be completed and retransmitted by the citizen user in real-time; (5) the computer system transmitting a judgment decision entered by a staff user to a citizen user as a result of a court hearing by the computer system; and (6) the computer system being adapted to receive a record of participation of a user and receiving from one or more user devices therein, audio and visual representations of participant users in the live session.

BRIEF SUMMARY OF THE INVENTION

It is therefore an advantage of the present invention to provide a method of implementing an interactive presentation comprising a computer system that includes a website and wherein the presentation generated during a live session is an interactive legal hearing held in real-time on the computer system and transmitted between a plurality of user devices.

It is an additional advantage of the present invention to provide a method of implementing an interactive presentation comprising a computer system that includes a website and wherein the website comprises a graphical user interface and a plurality of modules including a search module, a login authentication module, an information module, a queue module, a live session module, a court date scheduling module, an account profile module, a court staff module, a video module, a support queue module, and an admin dashboard module.

It is an additional advantage of the present invention to provide a computer system being adapted to transmit a graphical user interface to a user device and wherein the user interface displays user interface elements for interacting with a plurality of the computer system modules.

It is an additional advantage of the present invention to provide a computer system being adapted to receive requests for user access and user credentials from a plurality of user devices in a login authentication module and wherein the computer system creates user credentials in response to the request for credentials from a user in the login authentication module and authenticates the user credentials.

It is still an additional advantage of the present invention to provide a computer system being adapted to receive information pertaining to a user and correlating the information to court hearing information in an information module in response to the information entered therein. Wherein the computer system transmits the user information into a queue module and generates a live session by networking a plurality of participant users within a live session module.

It is still an additional advantage of the present invention to provide a computer system that transmits a presentation to the user participants of a live session, a plurality of forms from a user authenticated as a staff user to a user authenticated therein as a citizen user via a network. Wherein the forms are completed and retransmitted by the citizen user in real-time.

It is still an additional advantage of the present invention to provide a computer system that transmits a judgment decision entered by a staff user to a citizen user as a result of a court hearing by the computer system.

It is still an additional advantage of the present invention to provide a computer system that is adapted to receive a record of participation of a user and receiving from one or more user devices audio and visual representations of participant users in a live session.

It is still an additional advantage of the present invention to provide a computer system that is adapted to transmit via a network, audio and visual representations of participant users to other participant user devices and the transmitted audio and visual representations comprising the second presentation display and thereby terminating the second presentation display of one or more participant users in the live session.

It is still an additional advantage of the present invention to provide a computer system that is adapted to receive from one or more user devices, at the computer system, audio, video, text, either live or pre-recorded, or other evidentiary content of each participant user in the live session. Wherein the computer system is adapted to transmit via a network, the evidentiary content to other user devices, the transmitted evidentiary content comprising the first presentation display and thereby terminating the first presentation display of one or more user participants in the live session.

It is still an additional advantage of the present invention to provide a non-transitory computer-readable medium having stored thereon a set of instructions that are executable by a processor of a computer system to carry out a method of implementing an interactive presentation comprising a computer system that includes a website and wherein the presentation generated during the live session is an interactive legal hearing held in real-time on the computer system and transmitted between a plurality of user devices.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE SEVERAL VIEWS OF THE DRAWINGS

The present embodiments are illustrated by way of the figures of the accompanying drawings, which may not necessarily be to scale, in which like references indicate similar elements, and in which.

DETAILED DESCRIPTION OF THE INVENTION

Figure 1:
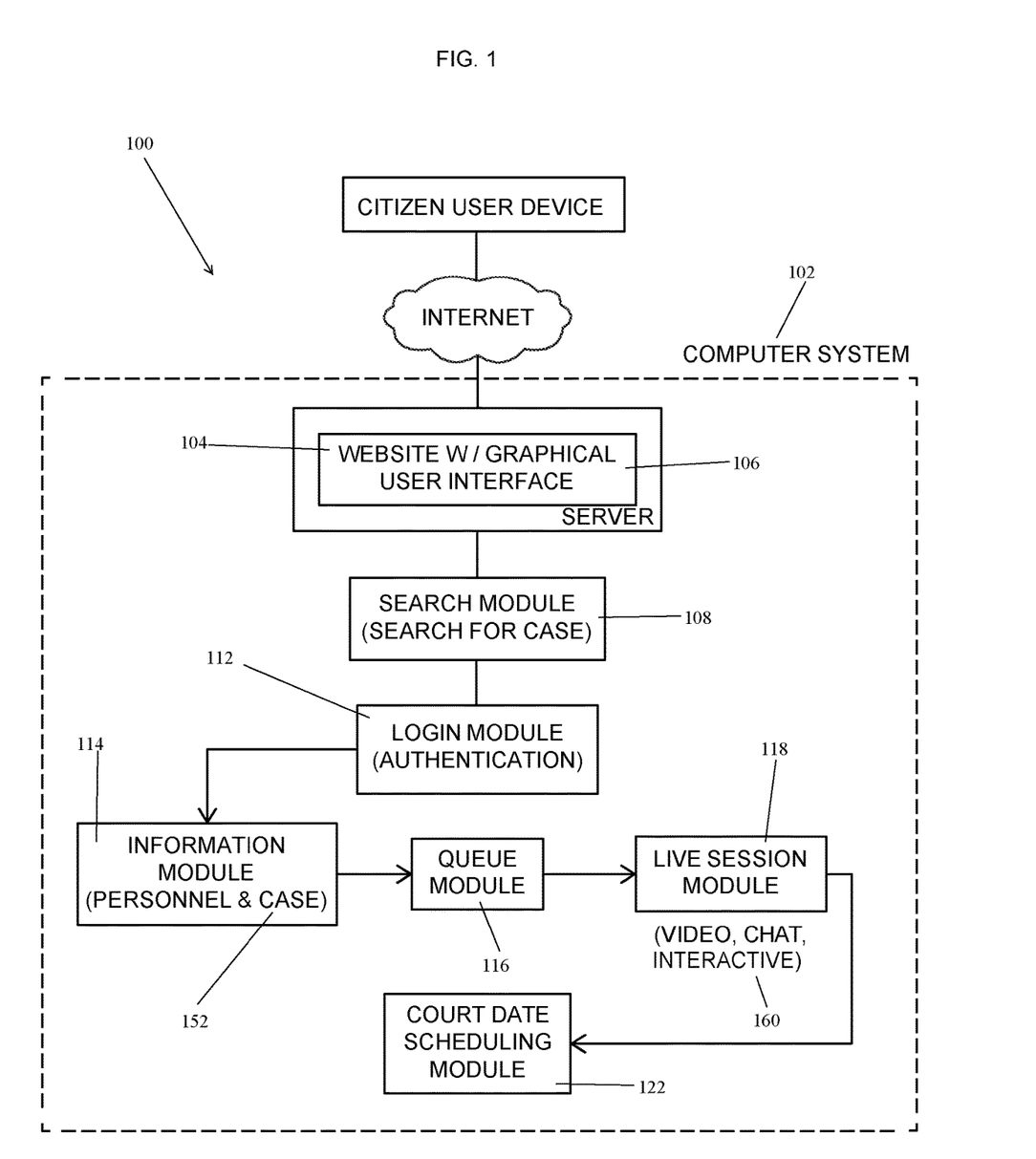
FIG. 1 illustrates a process flow diagram illustrating the method of implementing an interactive presentation in the form of an interactive legal hearing and the modules and graphical user interface being associated therewith.
Figure 2:
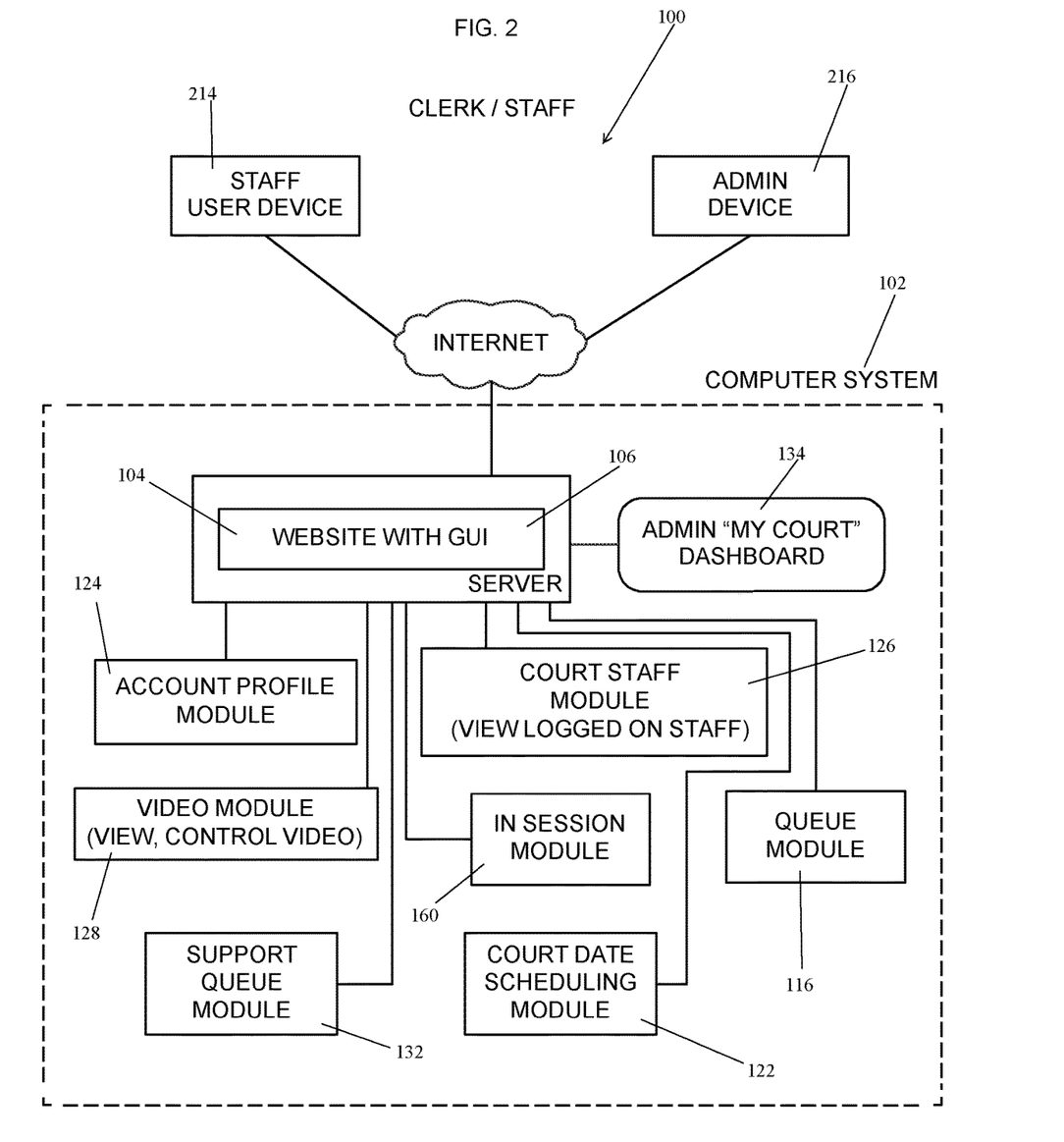
FIG. 2 illustrates a process flow diagram of the method a staff user would use to implement an interactive legal hearing and the modules being associated therewith.
Figure 3:
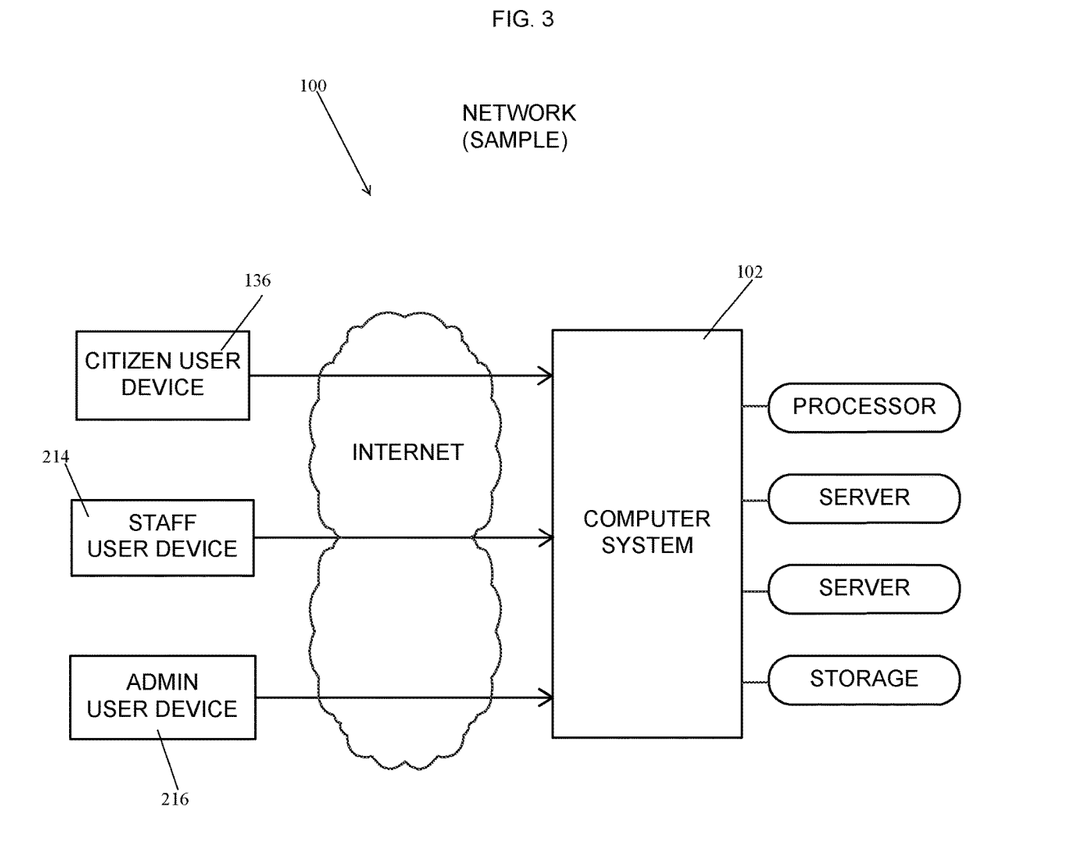
FIG. 3 illustrates a layout diagram depicting the exemplary relationships between the various users in the interactive legal hearing configured in accordance with the present invention.

A method 100 of implementing an interactive presentation is disclosed. Exemplary applications of the present invention to the audio and visual proceedings between pre-selected parties in a virtual courtroom environment are provided in FIGS. 1-3. As illustrated in FIGS. 1-3, the method 100 comprises a computer system 102 that includes a website 104 having a graphical user interface 106 and plurality of data operation modules including a search module 108, a login authentication module 112, an information module 114, a queue module 116, a live session module 118, a court date scheduling module 122, an account profile module 124, a court staff module 126, a video module 128, a support queue module 132, and an admin dashboard module 134. As illustrated in the drawings, the method 100 is adapted to transmit, by the computer system 102, a graphical user interface 106 to a citizen user device 136. While the system as illustrated in FIGS. 1-3 is generated during the live session 160 of interactive legal proceeding, it will be appreciated from the discussion provided herein that it may be adapted for use in any type of virtual presentation 200 which would require the computer-assisted interaction of users 136, 214, 216 across a broad spectrum of technologies.

[0034] The graphical user interface 106 displays user interface elements 107 for interacting with the plurality of computer system modules. The login authentication module 112 and graphical user interface 106 that may be employed in a typical courtroom environment are further illustrated in FIGS. 4 and 5. A user may be categorized as a citizen user 136, a staff user 214, or an admin user, 216 and wherein credentials to access the plurality of computer system modules are issued and authenticated based on the category of each user 136, 214, 216. A user categorized as a staff user 214 or an admin user 216 controls the interactive presentation and displays during the live session 160. A user categorized as a staff user 216 or an admin user 216 controls the user participants present in the live session to include adding, removing and transferring users between live sessions 160.

Figure 4:
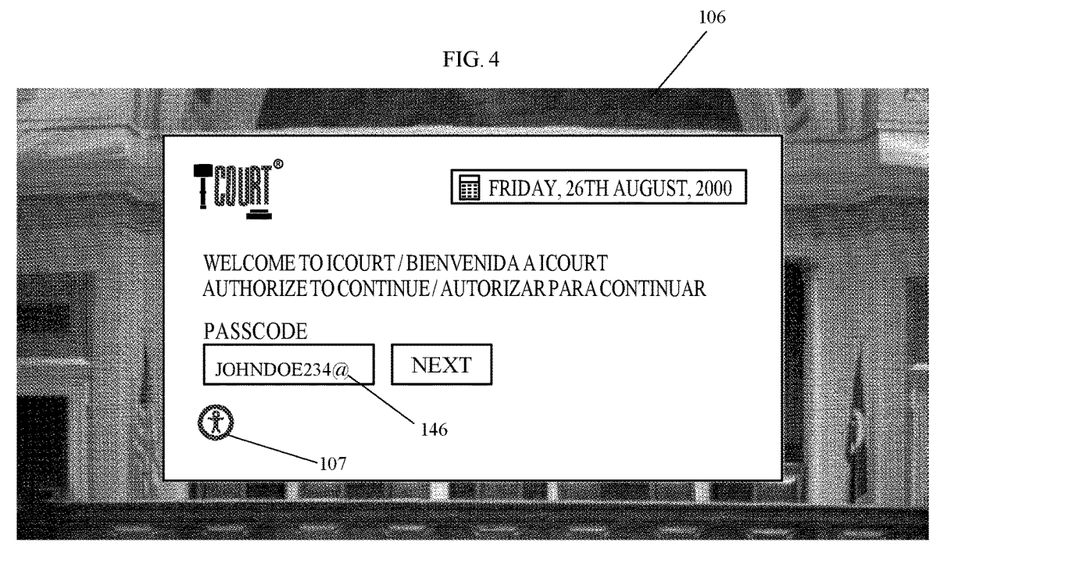
FIG. 4 is an illustrative screen that is displayed for a user when the user logs into the website in accordance with the present invention.
Figure 5:
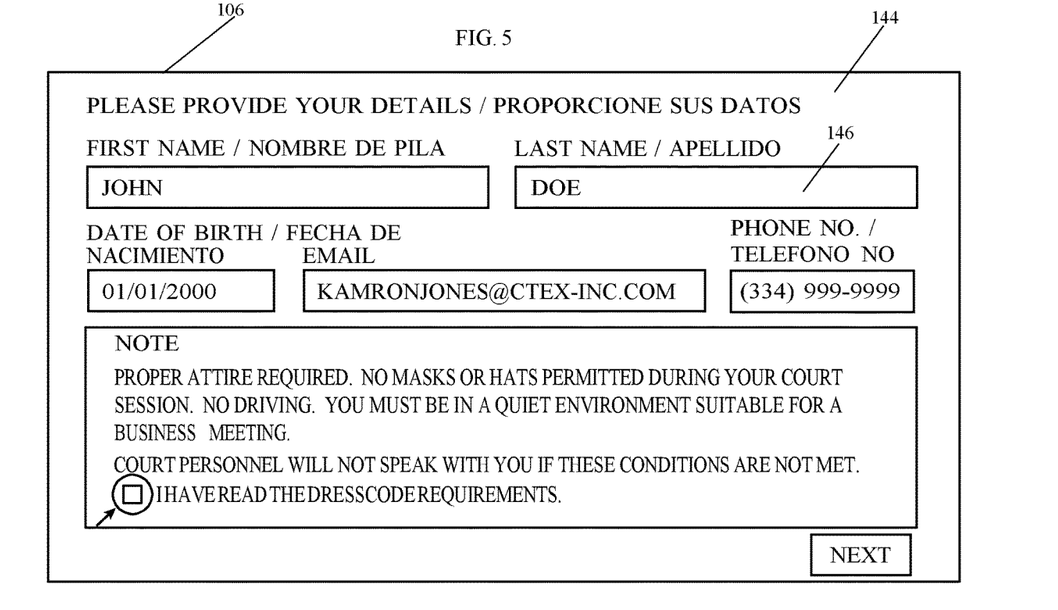
FIG. 5 illustrates an exemplary citizen user's information screen wherein the citizen user enters personal information.

As illustrated in FIGS. 4-5, the computer system 102 receives a request for user access and user credentials 146 from a citizen user 136 in the login authentication module 112. User credentials 146 are created and further authenticated by the computer system 102 in the login authentication module 112 in response to a request for credentials from a citizen user 136 in the login authentication module 112. FIGS. 4 and 5 illustrate the desired graphical user interface 106 for entry into the legal proceedings. As illustrated, this authentication framework enables a citizen user 136 to log in to the website 104 using any Internet-connected device, such as smartphone, or tablet, through which they establish their identity before the additional methods of conducting the proceedings are established. The proceeding is thereby established in a virtual setting among a plurality of preselected and credentialed users 136, 214, 216 that are defined by established legal rules for the legal administration of the proceedings. These parties can include at least one of a plurality of citizen users 136, lawyers, judges, court staff, interpreters, or as further provided herein.

Figure 6:
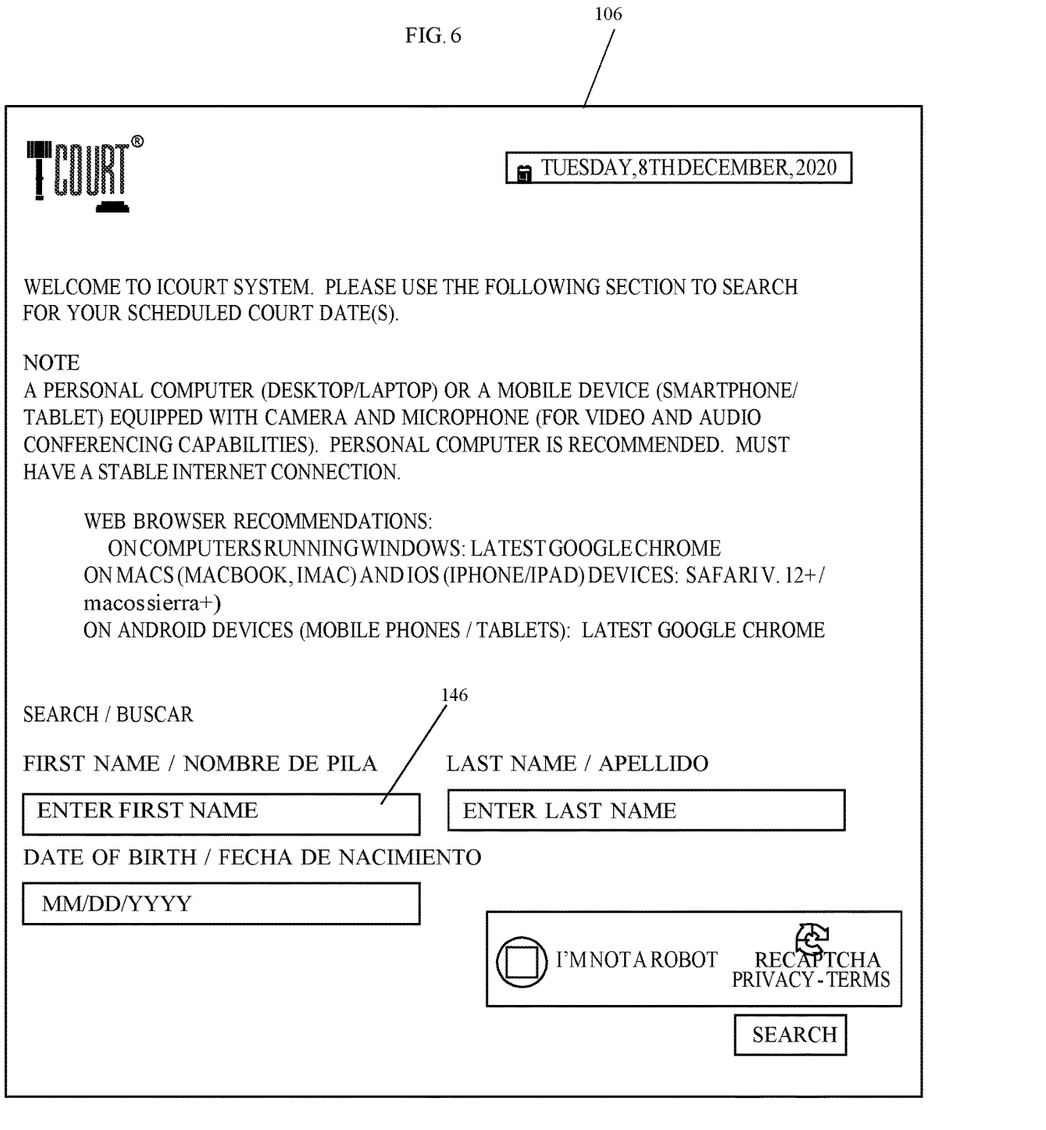
FIG. 6 is an illustrative screen wherein the citizen user searches for a scheduled court date.
Figure 7:
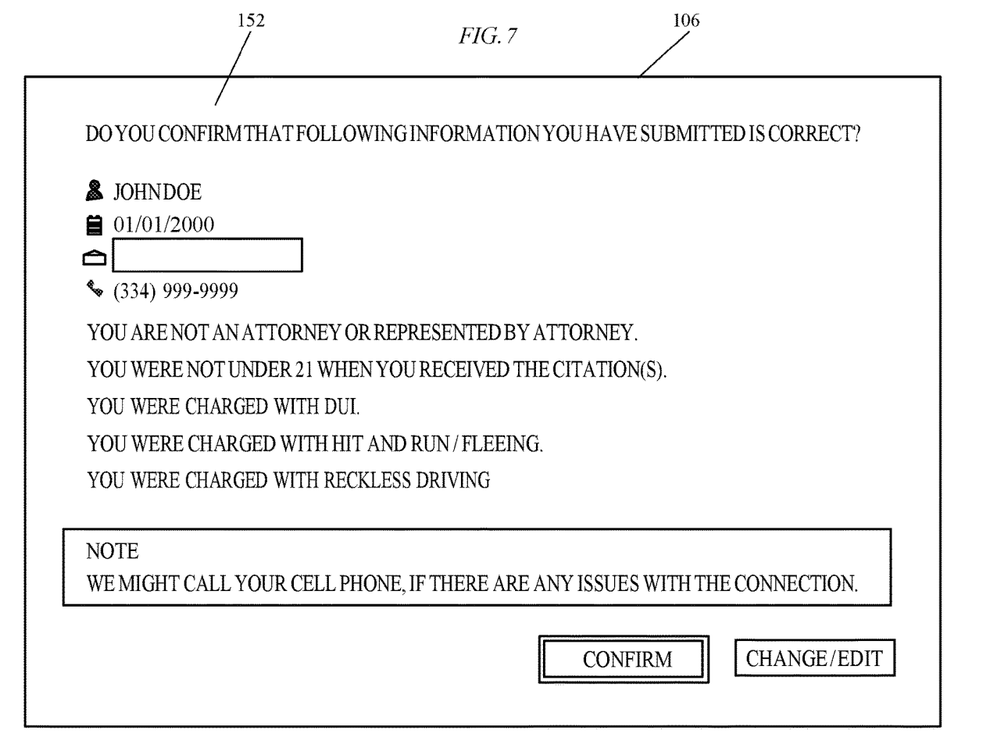
FIG. 7 is an illustrative screen wherein the citizen user will answer a series of questions relating to a case.

In FIGS. 6 and 7, the computer system 102 receives information 152 pertaining to a citizen user 136 in the information module 112 and wherein the information 152 correlates to court hearing information therein. The interactive court proceedings therefore include access to court documents that are supported by the steps provided in the online proceedings. Exemplary representations of this receipt of information 152 in an information module 114 is further provided in FIGS. 6 and 7 wherein the computer system 102 is configured to determine, upon receipt, a graphical illustration of the relevant portions of the information 152 that should be viewed.

Figure 8:
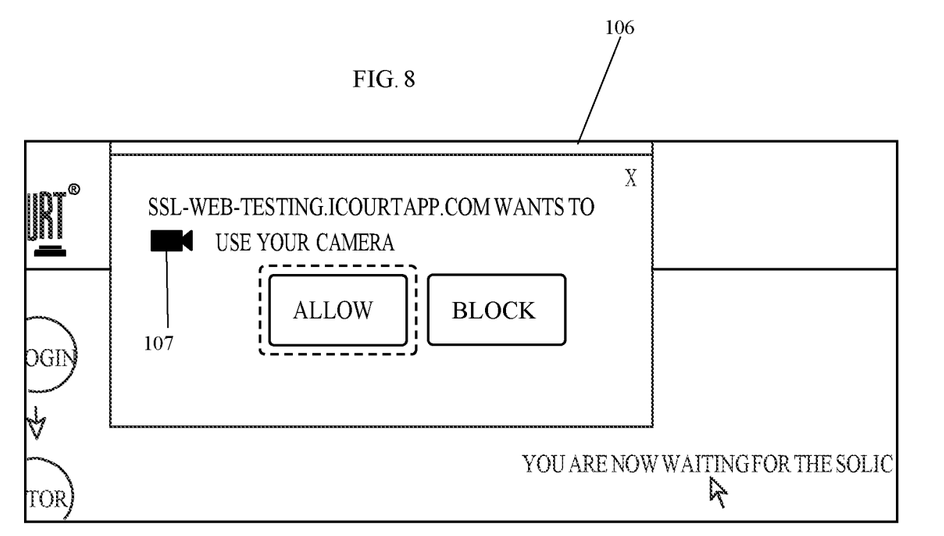
FIG. 8 is an illustrative screen of the queue module that enables a user to access the live session module.
Figure 9:
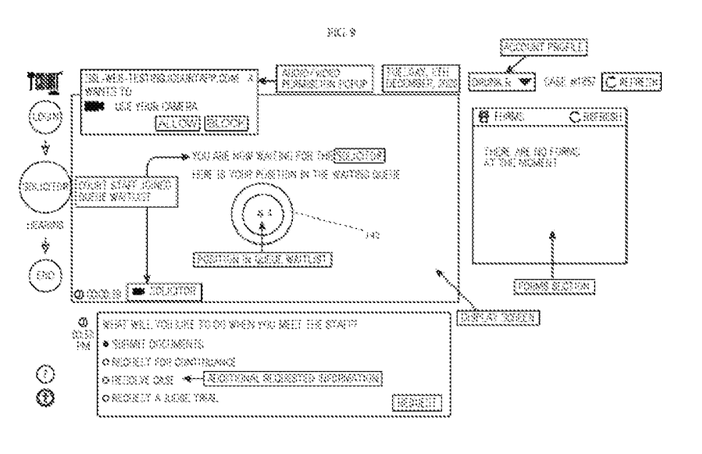
FIG. 9 is an illustrative screen showing the queue session module in accordance with the present invention.
Figure 10:
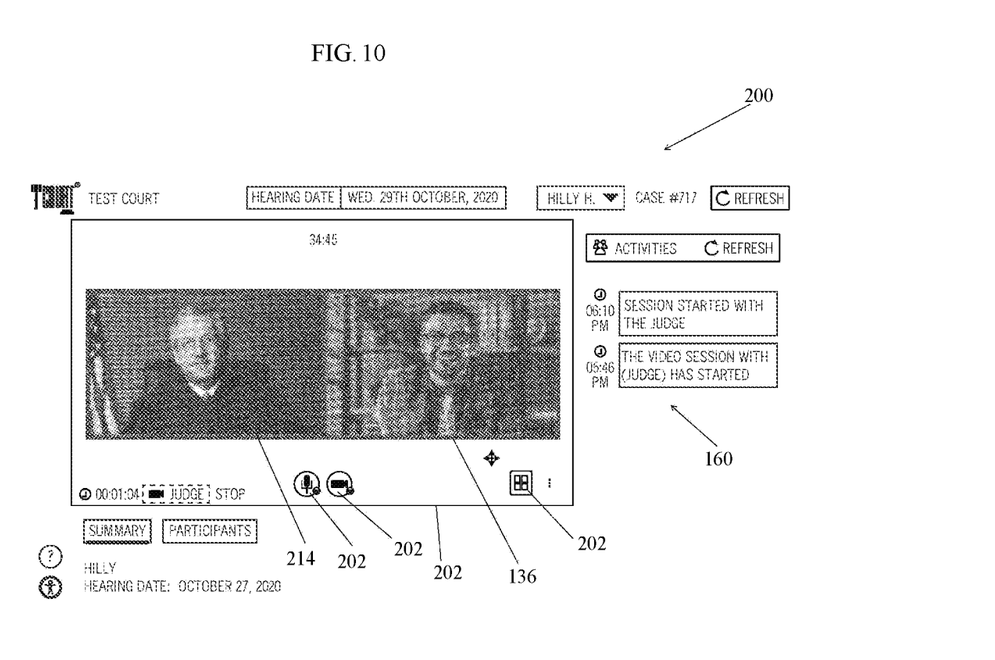
FIG. 10 illustrates the live session module in accordance with the present invention.

In response to information 152 entered in the information module 114, the computer system 102 transmits citizen user's information 152 into an exemplary queue module 116 shown in FIGS. 8 and 9. If accepted by the citizen user 136, the computer system 102 thereby generates a live session 160 by networking a plurality of staff users 214 and citizen users 136 within the live session module 118 shown in FIG. 10 and generates a presentation 200 within the live session 160 thereof. Each citizen user 136 receives a customized grace period from a control interface 142 establishing how early and how late each user citizen 136 can join the presentation 200. The presentation 200 comprising a first presentation display and a second presentation display and wherein the first presentation display comprises audio, video, text, either live or pre-recorded, or other evidentiary content. The first presentation may have an interactive interface 202. The second presentation display comprises live video representations of users 136, 214, 216 participating in the live session 160. The computer system 102 then transmits via a network, the presentation to the user participants 136, 214, 216 of the live session 160. The presentation 200 generated during the live session 160 is thereby an interactive legal hearing held in real-time on the computer system 102 and transmitted between a plurality of user devices 136, 214, 216 via the website 104.

Referring now to FIGS. 11-16, the computer system 102 transmits a plurality of forms 204 from a user authenticated as a staff user 214 to a user authenticated as a citizen user 136 and wherein the forms 204 may be completed and retransmitted by the citizen user 136 in real-time. The completion and retransmission of the plurality of forms 204 are provided without the start-up or completion that would be present in a traditional court setting. The computer system 102 is operable to transmit the documents in real-time after a first and second sequence as provided above to the citizen user 136 with a high transmission rate. The transmission rate to the citizen user 136 and the citizen user's response to receiving the plurality of forms 204 reduce the overall response and operation time of the proceedings. For example, the citizen user's response to receipt of the plurality of forms 204 can include signature or acknowledgement of review prior to a retransmission to a staff user 214.

Figure 11:
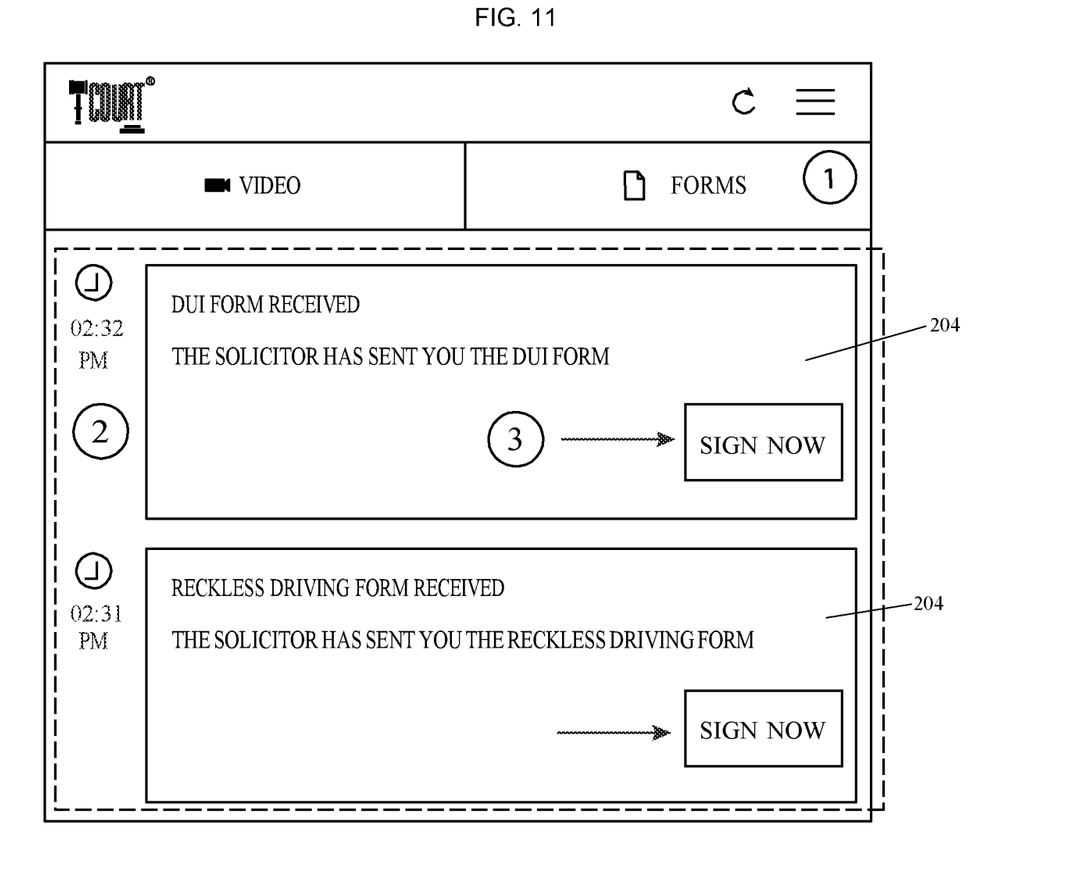
FIGS. 11-17 illustrate the plurality of input, forms, and judgments provided by a staff user in accordance with the present invention.
Figure 12:
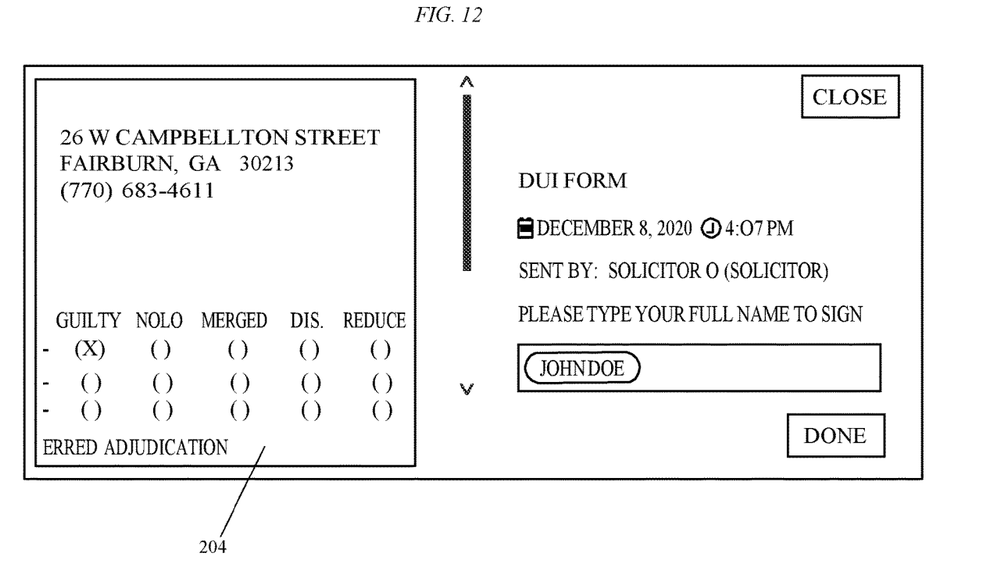
Figure 13:
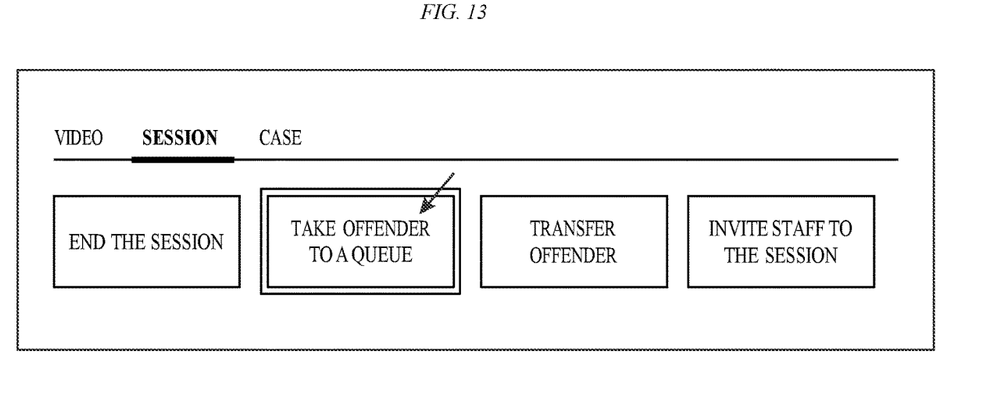
Figure 14:
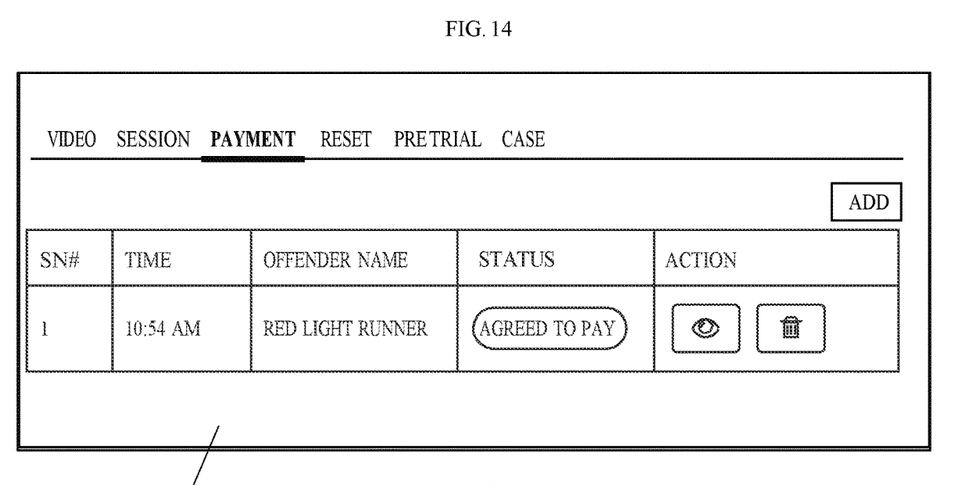
Figure 15:
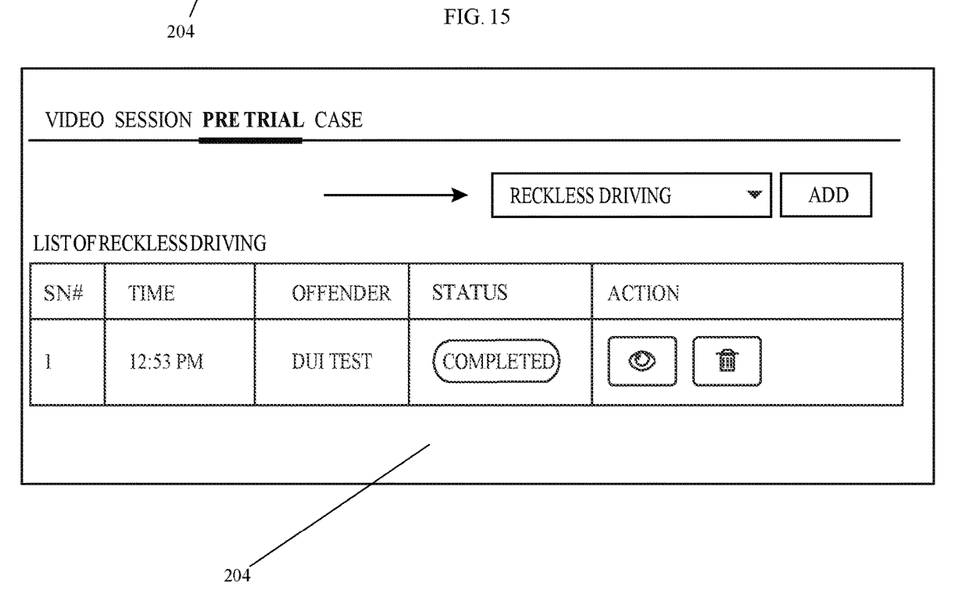
Figure 16:
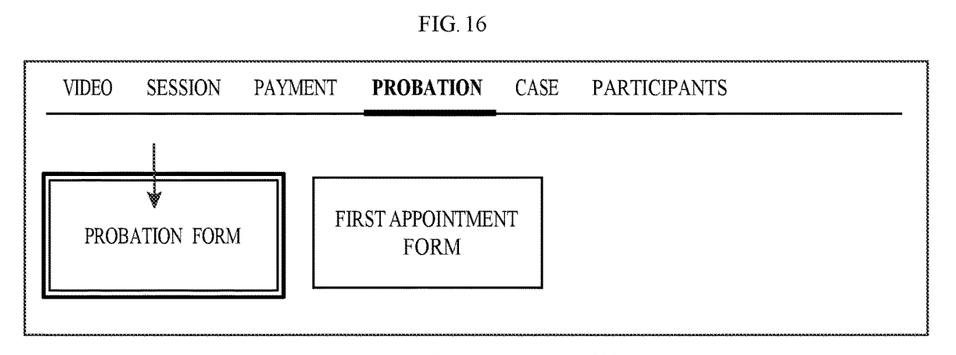
Figure 17:
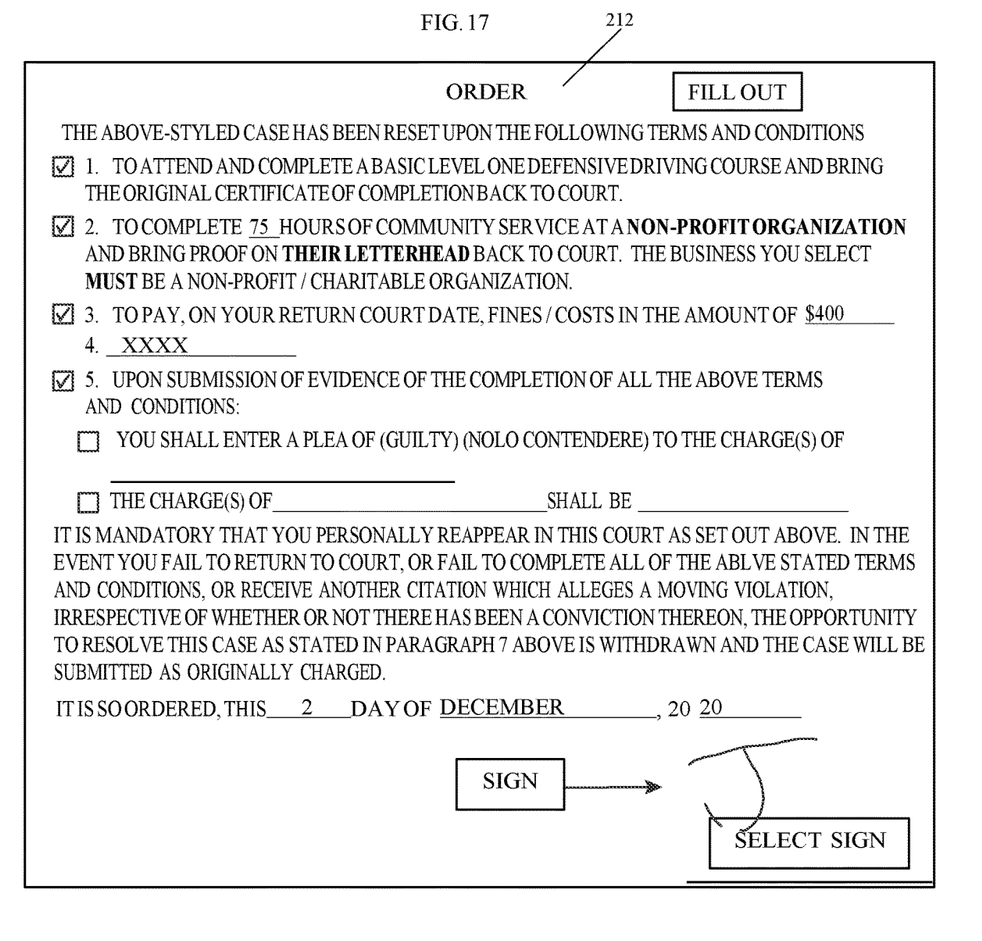

In the next step of the proceedings as shown in FIGS. 11 and 12, the computer system 102 receives input from at least one user 136, 214, 216 during the presentation 200 and transmits a judgment decision 212 entered by a staff user 214 to a citizen user 136 as a result of the court hearing (FIGS. 14-17). Procedures used during the interactive court proceeding, for example, the recognition of the citizen's voice input in response to a staff user 214, would thereby reflect the direct input into the computer system 102. For example, FIG. 13 illustrates a process for transferring a citizen user 136 to a separate transfer queue after a staff user 214 received input and performs the process. The next process input into the computer system 102 is a direct query or response provided in the presentation shown in FIG. 10. FIG. 13 further illustrates the transfer of a citizen user 136 to a private queue for a separate video or audio presentation with a selected staff and wherein the staff user 214 can select that no other citizen user 136 can be transferred to the private queue. The user can rejoin the first established presentation and the computer system 102 is adapted to perform the process on a continuous basis as provided by the staff user 214.

The computer system 100 receives from one or more user devices 136, 214, 216 a record of participation in the following manner from the participant users 136, 214, 216: (1) the computer system 100 transmits, via a network, audio and visual representations of the users to the user devices 136, 214, 216. The transmitted audio and visual representations thereby comprising the second presentation display and the transmission terminates the second presentation display of one or more user participants in the live session 160. (2) The computer system 100 receives from one or more user devices audio, video, text, either live or pre-recorded, or other evidentiary content from each participant user in the live session. The computer system 100 transmits, via a network, the evidentiary content to other user devices, by the computer system 100. The transmitted evidentiary content comprises the first presentation display and the transmission terminates the first presentation display of one or more user participants in the live session.

The legal hearing as illustrated in the drawings may be applied to virtual courtroom advocacy in the form of court arraignment hearings, a court first appearance hearing, a court bench trial, a court probation revocation hearing, or a court motion hearing or in additional hearings as provided herein. The presentation method is adapted in the arrangements provided in the drawings to improve the effective review and presentation of information 152 to a court staff as provided herein. Such presentation of information 152 would be enhanced as necessary to provide information 152 or documentary evidence to judges, attorneys, court staff, or to a jury. The invention as described herein can be adapted to conveniently provide the devices and adjusted presentation options in the form of increased screen displays or on-site mounted devices for purposes of carrying out the presentation 200 provided herein.

While a sample display format is provided for the graphical user interfaces 106 provided in the figures, it would be understood that this sample display may be customized in other arrangements that are specially adapted for various types of court proceedings or presentations. The various screens, including the log in screen, include the preferred format for an organized progression of a legal proceeding in accordance with the present invention. The arrangement can be re-developed to streamline the plurality of user interactions. For example, in a first and second presentation as provided herein, the graphical user interface 106 can be made user-friendly for the display of citizen user history, capable of indicating instructions in various languages, complex audio arrangements, gesture controls, embedded speech recognition systems, or a user interface display having a main screen being segregated into a plurality of screen arrangements.

Scheduling

The differing levels of scheduling tasks were chosen by the inventors to produce the functionality of the computer system 102 as a whole and to reduce task-events conflicts as required by law. The citizen user 136 is referenced as an attendee or offender therein.
(1) Admin/host can schedule and provide each attendee/offender a unique passcode to join.
(2) If the offender has an attorney, the computer system 102 will generate a unique passcode for the attorney so that attorney and the offender will be together when talking to court staff.
(3) Court Clerk/host can reset/reschedule an offender with a new court date right away while talking to the offender.
(4) Court system has ability to import batch schedules (.csv, .pdf file formats) from other systems, will give warning if there is any error or duplication before completing the import process.

Workflow

The preferred workflow functionality as chosen by the inventors for managing the computer system 102 in a plurality of graphical user interfaces 106 is as follows:
(See FIGS. 1-3 below)
(1) The computer system 102 has a workflow process for attendees/offenders to follow/answer, before talking to a court staff. Based on offender's answers, the computer system will take the offender to a selected court staff for video conferencing.
(2) The computer system 102 provides for a grace period that court admin can setup to customize how early and how late attendees can join a scheduled court session.

Process

The preferred queue module 116 and live session module 118 functionalities as chosen by the inventors for managing the computer system 102 in a plurality of graphical user interfaces 106 are as follows:
(See FIGS. 1-3 below)
(1) A court staff/host and an offender are in a private room, no other offender users can join, other offenders are in waiting queue of a court staff, waiting to be accepted to talk to the court staff (2) A court staff/host can transfer the attendee/offender to another court staff. The offender will be placed in a waiting queue until being accepted to video conferencing with the staff.
(3) A court staff/host can invite other court staffs to join the session with them and the offender.
(4) A court staff/host can put the offender on hold and privately video talk to other court staffs.
(5) A court staff/host can turn on and turn off their video/audio and offender video/audio.

File Processing

A court staff/host can fill out custom forms, sign and send to offenders/attendees for them to sign/acknowledge and send back.

Court Sessions

The application of the computer system 102 will be used in the following court proceedings:
(1) Municipal Court arraignment hearings
(2) Municipal Court first appearance hearings
(3) Municipal Court bench trials
(4) Municipal Court probation revocation hearings
(5) State Court (Magistrate, State, Superior) arraignment hearings
(6) State Court (Magistrate, State, Superior) first appearance hearings
(7) State Court (Magistrate, State, Superior) bench trials
(8) State Court (Magistrate, State, Superior) probation revocation hearings
(9) State Court (Magistrate, State, Superior, Appellate, Supreme) motion hearings
(10) Federal Court arraignment hearings
(11) Federal Court first appearance hearings
(12) Federal Court bench trials
(13) Federal Court probation revocation hearings
(14) Federal Court (Magistrate, Circuit, Appellate, Supreme) motion hearings Having described the invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. A method of implementing an interactive presentation comprising: a computer system that includes a website having a graphical user interface and a plurality of computer system modules including a search module, a login authentication module, an information module, a queue module, a live session module, a court date scheduling module, an account profile module, a court staff module, a video module, a support queue module, and an admin dashboard module, the computer system further comprising:
transmitting, by the computer system, a graphical user interface to a user device, wherein the graphical user interface displays user interface elements for interacting with a plurality of computer system modules;
receiving, by the computer system, a request for user access and user credentials from a plurality of user devices in the login authentication module;

creating user credentials, by the computer system, in response to a request for credentials from a user in the login authentication module;

authenticating user credentials, by the computer system, in the login authentication module;

receiving information pertaining to a user, by the computer system, correlating said information to court hearing information in the information module;

in response to information entered in the information module, transmitting user information into the queue module, by the computer system;

generating a live session by networking a plurality of users within the live session module by the computer system, wherein a staff user or an admin user controls user participants present in the live session to include adding, removing and transferring users from one live session to another live session;

generating a presentation in the live session, by the computer system, the presentation comprising a first presentation display and a second presentation display, where the first presentation display comprises audio, video, text, either live or pre-recorded, or other evidentiary content and may have an interactive interface, the second presentation display comprises live video representations of users participating in the live session;

transmitting via a network, by the computer system, the presentation to the user participants of the live session;

transmitting a plurality of forms from a user authenticated as the staff user to a user authenticated as a citizen user, by the computer system, wherein said forms may be completed and retransmitted by the citizen user in real-time;

receiving input from at least one user, by the computer system, during the presentation;

and transmitting a judgment decision entered by the staff user to a citizen user as a result of the court hearing, by the computer system.

2. The method of claim 1, wherein the presentation generated during the live session is an interactive legal hearing held in real-time on the computer system and transmitted between a plurality of user devices via the website.

3. The method of claim 2, wherein the legal hearing may be a court arraignment hearing, a court first appearance hearing, a court bench trial, a court probation revocation hearing, or a court motion hearing.

4. The method of claim 1, wherein a user may be categorized as a citizen user, the staff user or an admin user, and where credentials to access the various computer system modules are issued and authenticated based on the category of each user.

5. The method of claim 1, wherein a user categorized as the staff user or an admin user controls the interactive presentation and displays during the live session.

6. The method of claim 1, further comprising:
receiving at the computer system a record of participation of a user, receiving from one or more user devices, at the computer system, audio and visual representations of participant user in the live session;

transmitting via a network, audio and visual representations of said users to other user devices, by the computer system, the transmitted audio and visual representations comprising the second presentation display;

terminating the second presentation display of one or more user participants in the live session.

7. The method of claim 1, further comprising:
receiving from one or more user devices, at the computer system, audio, video, text, either live or pre-recorded, or other evidentiary content participant user in the live session;

transmitting via a network, the evidentiary content to other user devices, by the computer system, the transmitted evidentiary content comprising the first presentation display;

terminating the first presentation display of one or more user participants in the live session.

8. A non-transitory computer-readable medium having stored thereon a set of instructions that are executable by a processor of a computer system to carry out a method of implementing an interactive presentation comprising:

a website having a graphical user interface, a search module, a login authentication module, an information module, a queue module, a live session module, a court date scheduling module, an account profile module, a court staff module, a video module, a support queue module, and an admin dashboard module:

transmitting, by the computer system, a graphical user interface to a user device, wherein the user interface displays user interface elements for interacting with a plurality of computer system modules;

receiving, by the computer system, a request for user access and user credentials from a plurality of user devices in the login authentication module;

creating user credentials, by the computer system, in response to a request for credentials from a user in the login authentication module;

authenticating user credentials, by the computer system, in the login authentication module;

receiving information pertaining to a user, by the computer system, correlating said information to court hearing information in the information module;

in response to information entered in the information module, transmitting user information into the queue module, by the computer system;

generating a live session by networking a plurality of users within the live session module by the computer system, wherein the staff user or an admin user controls user participants present in the live session to include adding, removing and transferring users from one live session to another live session;

generating a presentation in the live session, by the computer system, the presentation comprising a first presentation display and a second presentation display, where the first presentation display comprises audio, video, text, either live or pre-recorded, or other evidentiary content and may have an interactive interface, the second presentation display comprises live video representations of users participating in the live session;

transmitting via a network, by the computer system, the presentation to the user participants of the live session;

transmitting a plurality of forms from a user authenticated as the staff user to a user authenticated as a citizen user, by the computer system, wherein said forms may be completed and retransmitted by the citizen user in real-time;

receiving input from at least one user, by the computer system, during the presentation;

and transmitting a judgment decision entered by the staff user to a citizen user as a result of the court hearing, by the computer system.

* * * * *